(12) United States Patent
Hwang

(10) Patent No.: US 6,701,208 B2
(45) Date of Patent: Mar. 2, 2004

(54) APPARATUS AND METHOD OF PROPOSING BENDING SEQUENCES AND BENDING TOOLS FOR A METAL PLATE PART

(75) Inventor: Yearn-Tzuo Hwang, Irvine, CA (US)

(73) Assignee: Amada Company, Limited., Kanagawa (JP)

( * ) Notice: Subject to any disclaimer, the term of this patent is extended or adjusted under 35 U.S.C. 154(b) by 15 days.

(21) Appl. No.: 09/944,072

(22) Filed: Sep. 4, 2001

(65) Prior Publication Data

US 2003/0045948 A1 Mar. 6, 2003

(51) Int. Cl.⁷ .................. G06F 19/00; B21D 31/00
(52) U.S. Cl. ............... 700/165; 700/173; 700/178; 72/379.2
(58) Field of Search .................. 72/379.2, 441; 700/100, 165, 178, 173, 145, 160

(56) References Cited

U.S. PATENT DOCUMENTS

| | | | | |
|---|---|---|---|---|
| 4,831,862 A | * | 5/1989 | Ohashi et al. ............... 72/441 |
| 5,377,516 A | * | 1/1995 | Lipari ....................... 72/379.2 |
| 5,587,914 A | * | 12/1996 | Conradson et al. ........... 700/145 |
| 6,233,538 B1 | * | 5/2001 | Gupta et al. ..................... 703/7 |
| 6,243,611 B1 | | 6/2001 | Hazama et al. |
| 6,490,498 B1 | * | 12/2002 | Takagi .......................... 700/160 |

FOREIGN PATENT DOCUMENTS

WO    96/15481    5/1996

* cited by examiner

*Primary Examiner*—Albert W. Paladini
(74) *Attorney, Agent, or Firm*—Greenblum & Bernstein, P.L.C.

(57) ABSTRACT

An apparatus for proposing bending sequences and bending tools for a metal plate part includes system for storing a development plan of the metal plate part; system for detecting a plurality of bending sequence proposals which make it possible to manufacture the metal plate part based on the development plan, and bending tool proposals used in each bending process of each bending sequence proposal; and system for displaying the plurality of bending sequence proposals. Such display includes information showing the stage numbers in each bending sequence proposal.

17 Claims, 14 Drawing Sheets

FIG.6

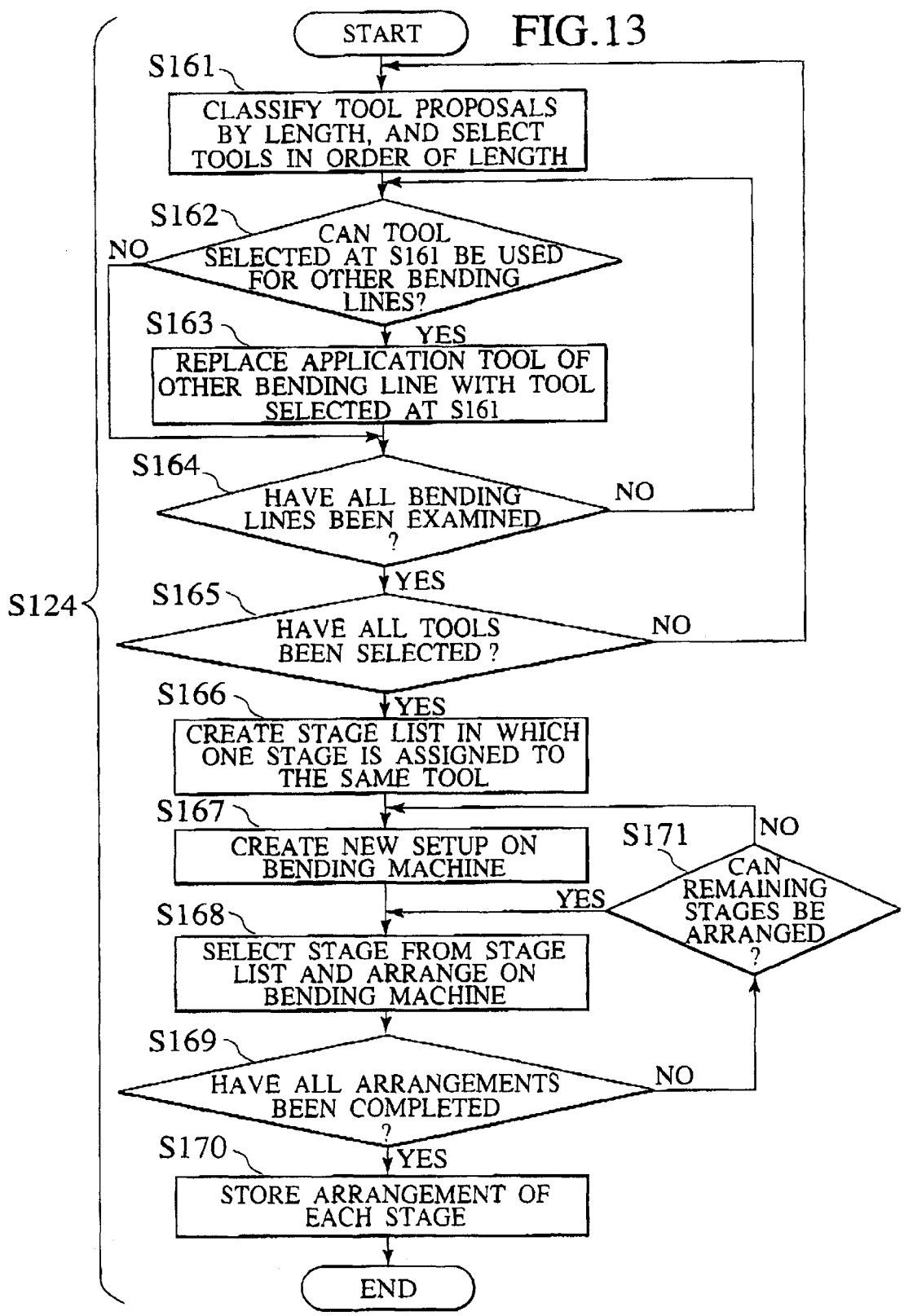

1. "CHECK FORWARD/REVERSE STATUS"

FORWARD STATUS

REVERSE STATUS

APPARATUS AND METHOD OF PROPOSING BENDING SEQUENCES AND BENDING TOOLS FOR A METAL PLATE PART

BACKGROUND OF THE INVENTION

1. Field of the Invention

This invention relates to an apparatus and method of proposing bending sequences and bending tools for a metal plate part.

2. Description of the Related Art

Various inventions have been proposed to determine which bending sequence and which bending tool should be used for each bending line of a metal plate part having a complex shape.

For example, in the method disclosed in International Patent Publication Number WO96/15481, bending sequences and bending tools used in each bending operation are automatically determined in accordance with constraints (restrictions) or cost by a cost computation program or heuristic program.

However, in this type of method, the bending sequence believed to be the optimum choice and the bending tools used for each bending operation in such bending sequence are determined in just one way by a computer. As a result, even though this determined bending sequence and the bending tools in such bending sequence may be the optimum bending sequence or bending tools as long as the computer recognizes, there are many cases where such solution is not necessarily compatible with the jobsite of the bending factory or an optimum choice therefor.

SUMMARY OF THE INVENTION

It is an object of the invention to provide an apparatus and method which make it possible to determine the bending sequences and bending tools for a metal plate part (having bent portions) that will be compatible with the jobsite at the bending factory, or that will be optimum for the jobsite by incorporating information on the actual conditions of the jobsite.

To achieve the above object, the apparatus of proposing bending sequences and bending tools for a metal plate part according to the present invention includes a system for storing a development plan of the metal plate part; a system for detecting a plurality of bending sequence proposals which make it possible to manufacture the metal plate part based on the development plan, and bending tool proposals used in each bending process of each bending sequence proposal; and a system for displaying the plurality of bending sequence proposals, wherein such display includes information showing the stage numbers in each bending sequence proposal.

Further, to achieve the above object, the method of proposing bending sequences and bending tools for a metal plate part according to the present invention includes the steps of receiving a development plan for the metal plate part; detecting a plurality of bending sequence proposals which make it possible to manufacture the metal plate part based on the development plan, and bending tool proposals used in each bending process of each bending sequence proposal; and displaying the plurality of bending sequence proposals, wherein such display includes information showing the stage numbers in each bending sequence proposal.

Preferably, the method of the present invention includes a step of storing retained tools.

Further, the method preferably includes a step of inputting a selection priority order of application tools.

Further, the method preferably includes a step of storing at least one priority item chosen from the minimum number of stages, the minimum number of turnovers, and the minimum number of rotations.

Further, the detection of the bending sequence proposals and the bending tool proposals is preferably carried out based on retained tool information or application tool selection priority order information.

Preferably, the bending sequence proposal display includes at least one information item from the information showing the setup number (the number of required setup operations), the number of turnovers, or the number of rotations in each bending sequence proposal, and information showing the total rotation angle in each bending sequence proposal.

Further, the bending sequence proposals are preferably displayed in an order starting from the minimum number of stages, the minimum number of turnovers, or the minimum number of rotations.

BRIEF DESCRIPTION OF THE DRAWINGS

FIG. 6 shows one example of a priority conditions display screen which is displayed on the display device after being generated by the priority conditions display screen generating means provided in the bending sequence and bending tool proposing apparatus (see FIG. 5).

FIG. 13 shows a flow chart of the method of organizing the tools and creating the stages and stage layout carried out at Step S124 of FIG. 10.

DETAILED DESCRIPTION OF THE PREFERRED EMBODIMENTS

An embodiment of the present invention will be described with reference to the accompanying drawings hereinafter.

Figure 1:
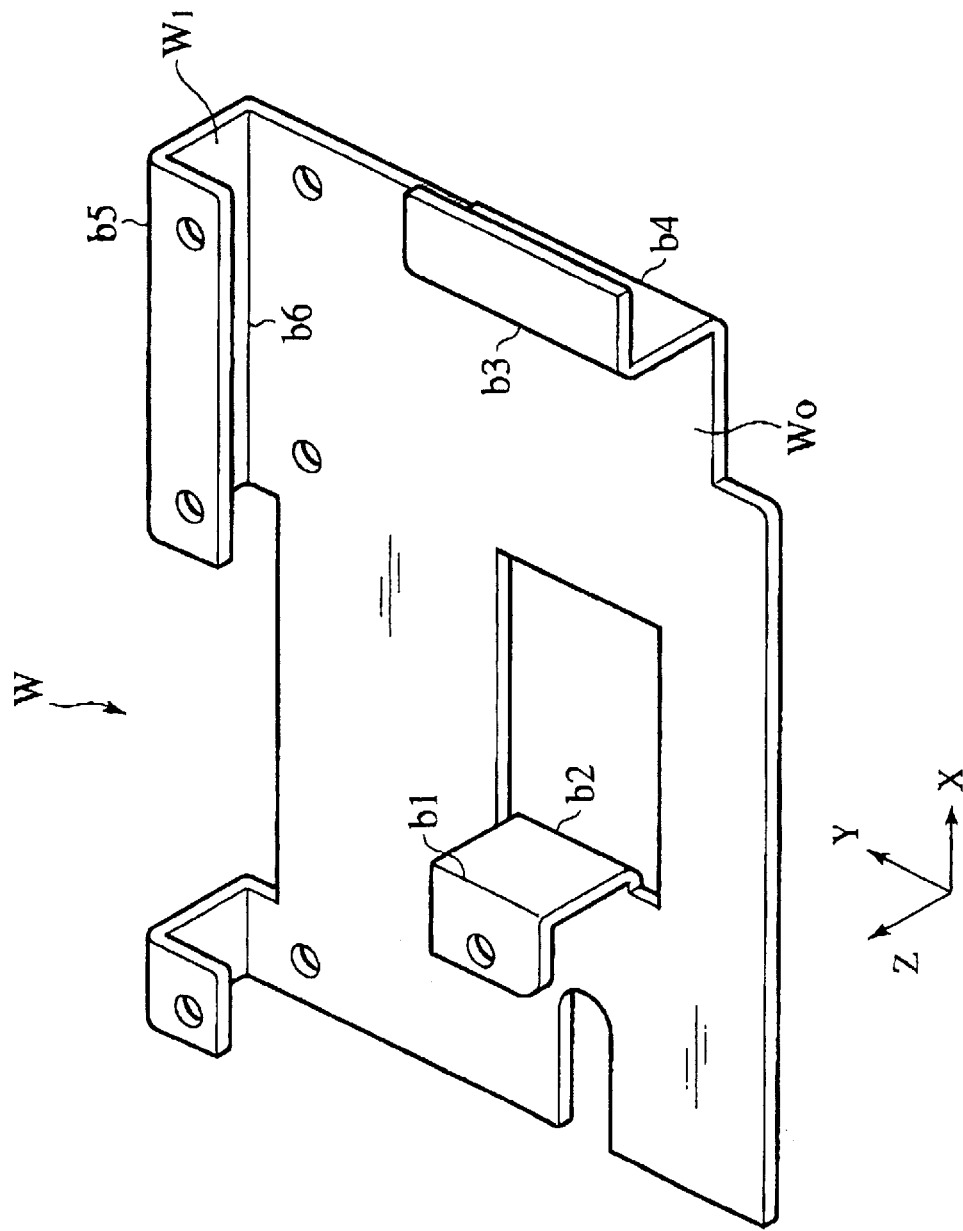
FIG. 1 is a perspective view showing one example of a metal plate work part W to which the embodiment of this invention is applied.

FIG. 1 shows one example of a metal plate work part W to which the present embodiment is applied.

As shown in FIG. 1, the metal plate part W has a plurality of bent portions or bending lines. Accordingly, when a bending process for forming these plurality of bending lines or bent portions is carried out, the bending sequence and the bending tools need to be determined in advance.

Figure 2:
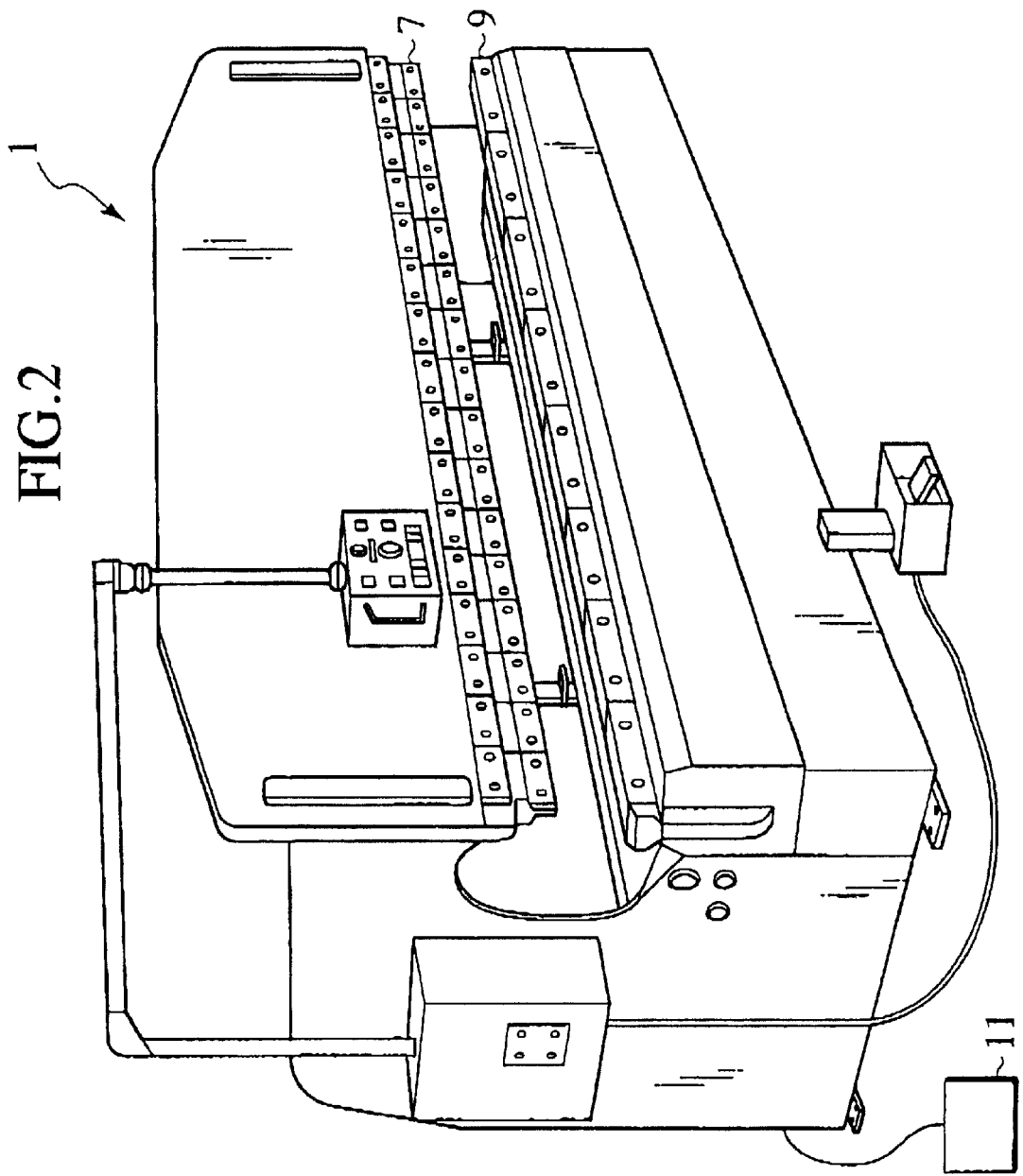
FIG. 2 is a perspective view showing one example of a press brake for carrying out a bending process for the metal plate work part shown in FIG. 1.

FIG. 2 shows one example of a press brake 1 for carrying out a bending process for making the bent work part W shown in FIG. 1.

Figure 3:
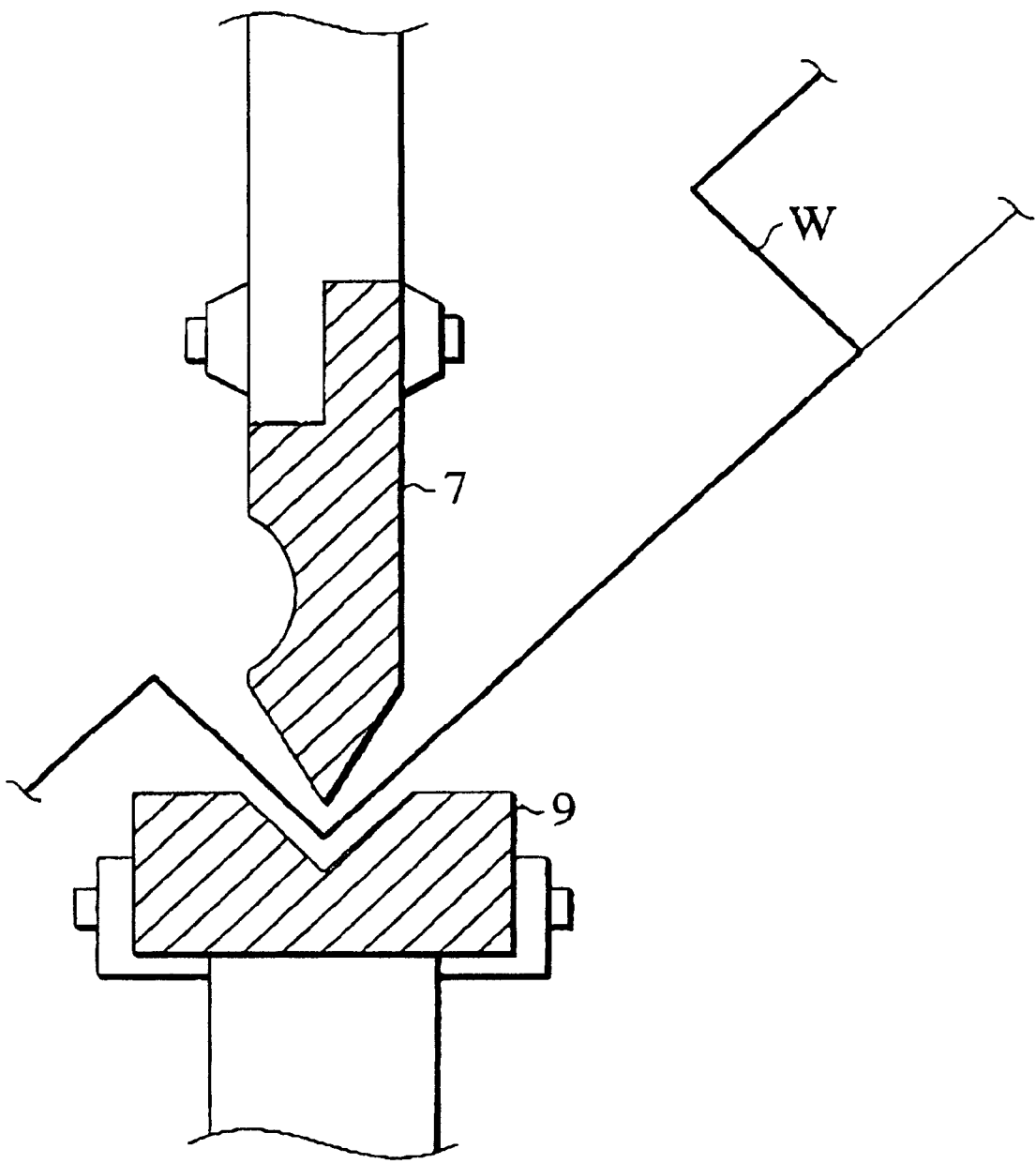
FIG. 3 is a cross-sectional view of an upper tool (punch) and lower tool (die) mounted in the press brake.

As shown in FIGS. 2 and 3, the press brake 1 is equipped with a punch 7 fixed to the frame, and a die 9 which can be freely moved up and down with respect to the punch 7. Namely, the metal plate work part W is inserted between the punch 7 and the die 9, and then the die 9 is forced toward the punch 7 to carry out a bending process on the metal plate work part W.

Further, as shown in FIG. 2, the press brake 1 is provided with a terminal 11 that serves as a CAM device. As will be described below, this terminal 11 is provided with the embodiment of an apparatus for proposing the bending sequences and bending tools according to the present invention. Further, the terminal 11 is also provided with input devices (not shown in the drawings) such as a keyboard, mouse and the like, and a display device such as a CRT or the like.

Figure 4:
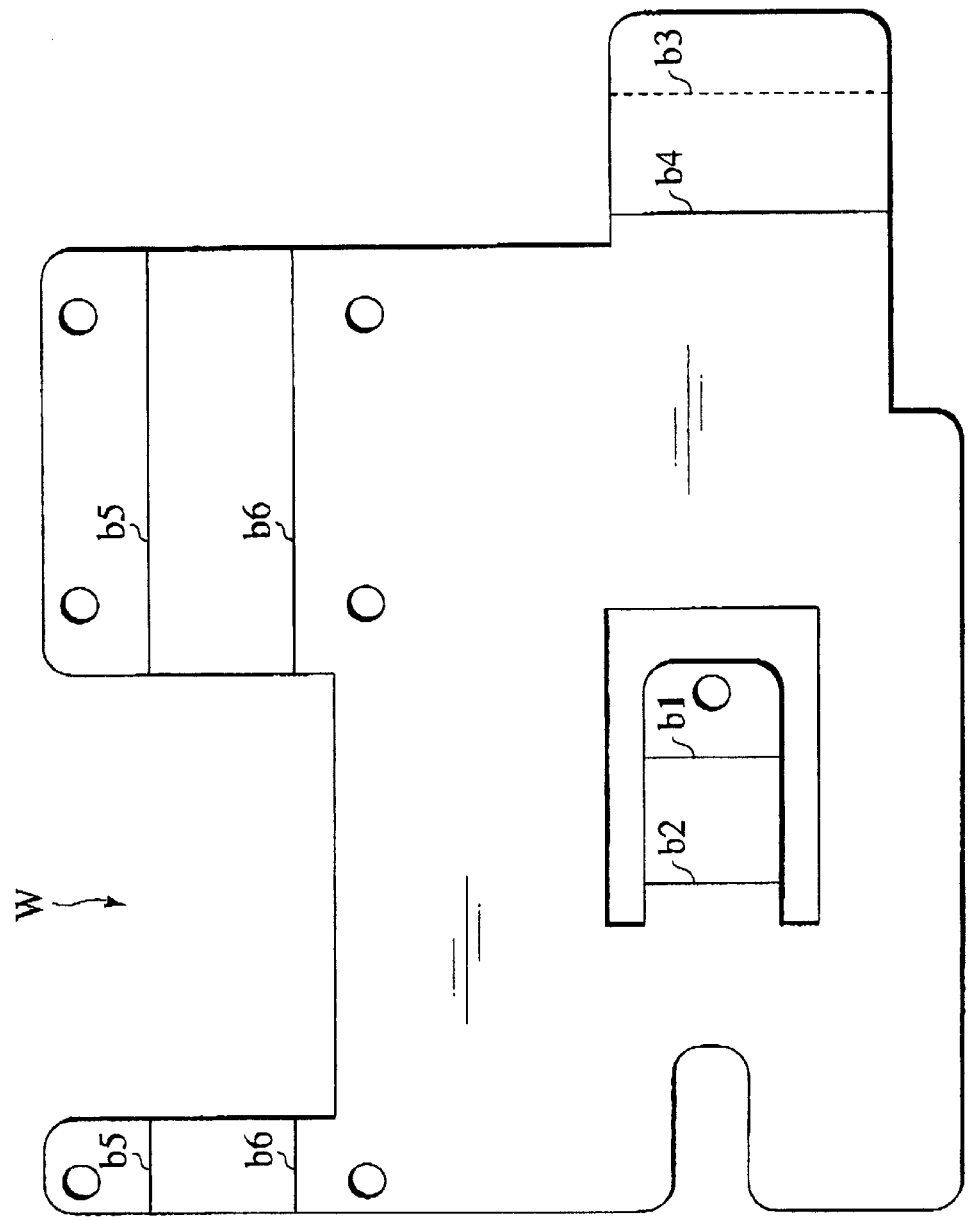
FIG. 4 is a development plan of the metal plate work part shown in FIG. 1.

FIG. 4 is a top view of the original flat state of the metal plate work part W showing the bending lines that will be used to form the bent portions.

Figure 5:
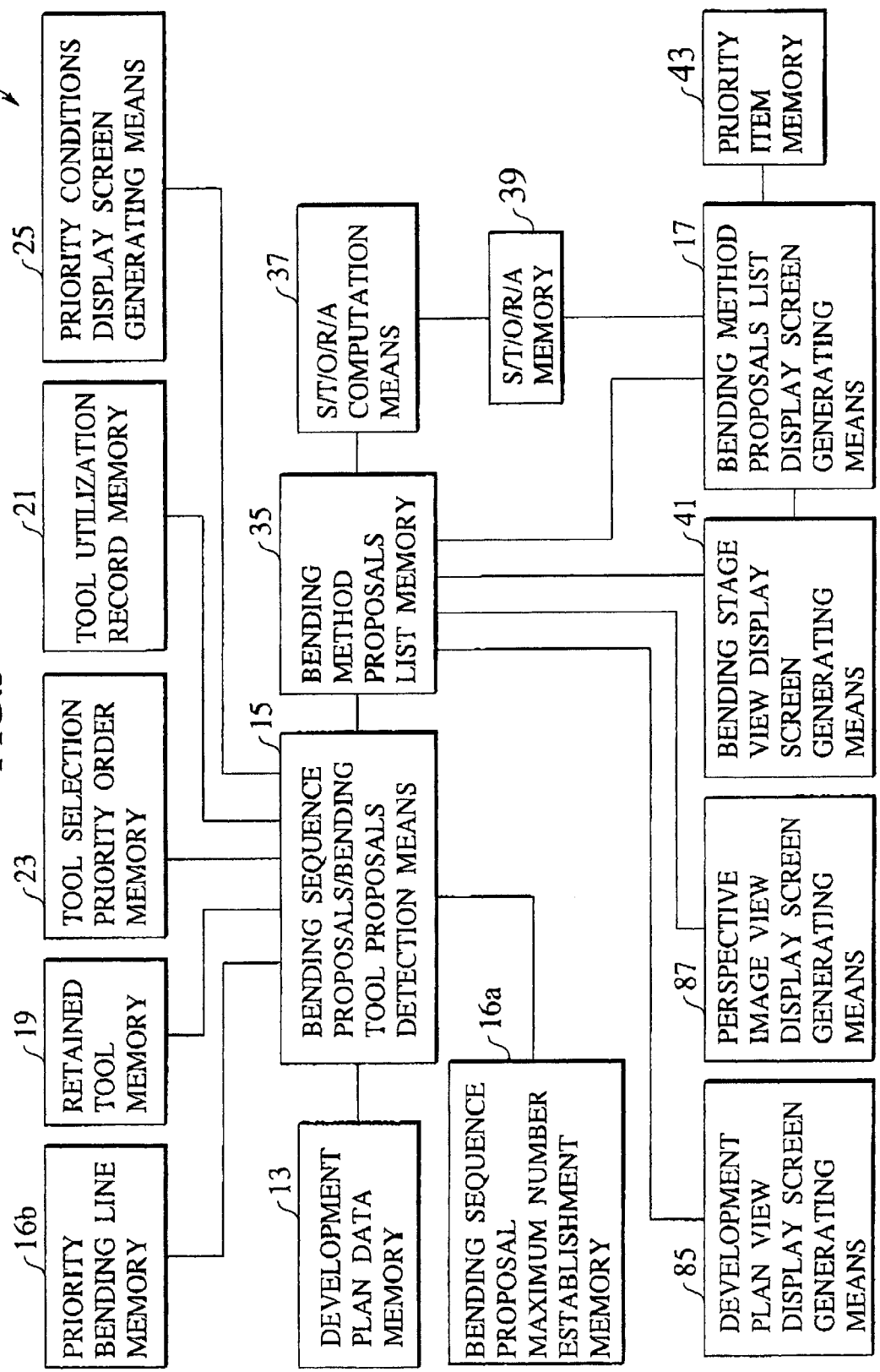
FIG. 5 is a block diagram showing an embodiment of an apparatus for proposing bending sequences and bending tools according to the present invention.

FIG. 5 is a block diagram showing one embodiment of an apparatus 12 for proposing bending sequences and bending tools according to the present invention.

As shown in FIG. 5, the proposing apparatus 12 includes a development plan storage means or system 13 for storing the development plan of the metal plate part, a detection means or system 15 for detecting a plurality of bending sequence proposals which make it possible to manufacture the metal plate part, and bending tool proposals used in each bending process of each bending sequence proposal, based on the development plan, and a bending method proposal list display screen generating means or system 17 for displaying a list of the plurality of bending sequence proposals.

In this regard, the bending method proposal list display screen includes a display 45 having a column 45c which shows the number of stages for each bending sequence proposal.

Further, the proposing apparatus 12 includes a storage means or system 19 for storing retained tools, a storage means or system 23 for storing the selected priority sequence of the application tools, and a storage means or system 43 for storing priority items. In this regard, the priority items include at least one item chosen from the minimum number of stages, the minimum number of turnovers, and the minimum number of rotations.

The detection of the bending sequence proposals and the bending tool proposals is carried out based on retained tool information or application tool priority information.

Further, the display 45 includes at least one item from the setup number (i.e, the number of required setup operations) 45b, the number of turnovers 45d, information showing the number of rotations 45e, and the total rotation angle 45f for each bending sequence proposal.

The display 45 displays in an order starting from the minimum number of stages, the minimum number of turnovers, or the minimum number of rotations.

A more detailed description is given below.

The proposing apparatus 12 for proposing the bending sequences and the bending tools is provided in the CAM 11 and includes a retained tool memory 19 for storing retained tools by the user who uses the press brake 1, a tool utilization record memory 21 for storing a tool utilization record which is a record showing the tools previously used by the user, and a tool selection priority memory 23 for storing the selected priority order of tools in selecting the bending tools for the bending process carried out on the work part W.

The proposing apparatus 12 is further provided with a priority conditions display screen generating means or system 25 for generating a priority conditions display screen 27 which includes the retained tools and the selected priority order of such tools.

Figure 6:
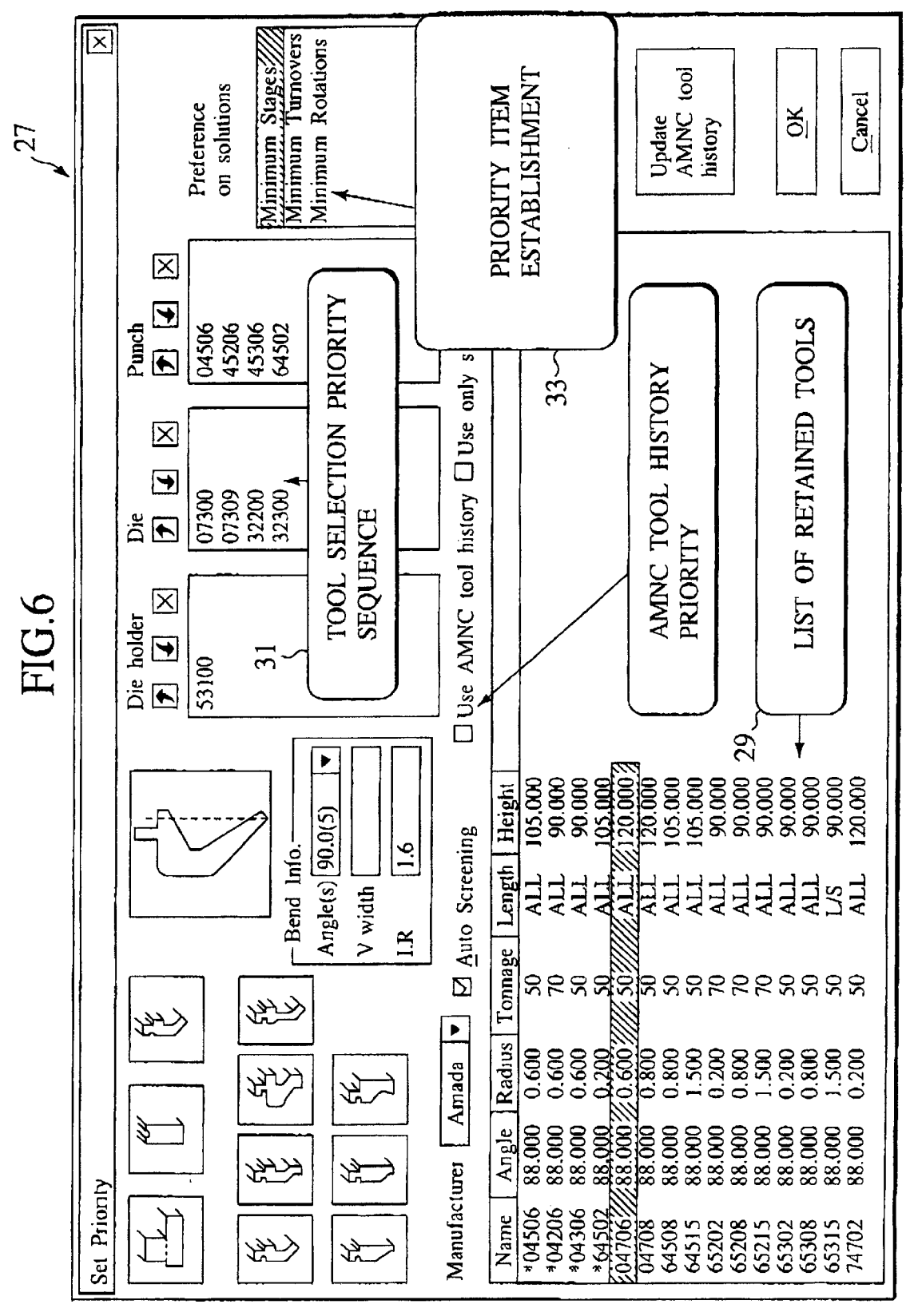

FIG. 6 shows the priority conditions display screen 27 generated by the priority conditions display screen generating means 25.

As shown in FIG. 6, the display screen 27 includes a list 29 of retained tools retained by the user, and a tool selection priority order display column 31 which shows the priority order in selecting the tools for each bending line.

The tools of the display column 31 can be manually selected in a sequential manner from the retained tools of the display column 29. Alternatively, by selecting one of the choices from a box 33, the tools can be determined based on the tool utilization record of the user in accordance with the frequency of utilization thereof.

In selecting the bending tools, the tools of the display column 31 are checked in an ordered manner from the top to determine whether or not they can be utilized.

In this way, starting from the top item, the tools listed in the display column 31 are checked to determine whether or not they can be utilized with the punch and die (i.e. whether or not there is interference with the work) in selecting the bending tool for the bending process carried out on the metal work part W.

The display screen 27 shown in FIG. 6 includes a priority item establishment display column 33 described below.

As shown in FIG. 5, the memories 19, 21, 23 and the display screen generating means 25 are connected to the detection means 15 which is connected to the memory 13.

Accordingly, as will be described below, the detection means 15 can detect bending sequence proposals and bending tool proposals for the bending process carried out on the work part W based on data from the memory 13 and the memory 23.

As shown in FIG. 5, the proposing apparatus 12 is also provided with a memory 35 for storing the bending sequence proposals and the bending tool proposals detected by the detection means 15.

As was already described above, the detection means 15 detects a plurality of bending sequence proposals which make it possible to carry out a bending process on the bending part W, and the bending tool proposals in each bending sequence proposal. Accordingly, the bending sequence proposals and the bending tool proposals are stored as a list in the memory 35.

The proposing apparatus 12 is further provided with a computation means or system 37 for computing the number of required setup operations S of the tool, the number of stages T of the tool, the number of front-back turnovers O of the work part W, the number of rotations R within the plane of the metal plate work part W, and the cumulative rotation angle A within the plane of the metal plate work part W for each bending sequence in the list based on the information stored in the memory 35.

The number of required setup operations S represents the number of times the punch 7 and/or the die 9 must be replaced during the bending process, if it is necessary to use punches 7 or dies 9 having different heights during the bending process carried out on the work part W.

The number of stages T represents the number of punch and die stages provided in the horizontal direction of the press brake 1 (see 49a, 49b in FIG. 7), if it is necessary to use punches or dies having different shapes (where the height of the, punches or dies are the same) during the bending process carried out on the work part W.

The number of front-back turnovers O represents the number of times the main surface W0 (see FIG. 1) which is the largest surface of the part W is turned over in a front to back or back to front manner during the bending process. Namely, the number of front-back turnovers O represents the number of times the part W is rotated in a manner that causes the main surface W0 to rotate 180 degrees around either the X-axis or Y-axis (see FIG. 1).

The number of rotations R represents the number of times the part W is rotated around the Z-axis which is orthogonal to the main surface W0 during the bending process. For example, when the work part W must be rotated three times around the Z-axis in the bending process carried out on the part W. the number of rotations R becomes 3, and in the case where the part W must be rotated around the Z-axis four times, the number of rotations R becomes 4.

The cumulative rotation angle A represents the cumulative amount of rotation of the work part W around the Z-axis orthogonal to the main surface W0 during the bending process. For example, in the case where the work part W is rotated around the Z-axis three times, the cumulative rotation angle A is obtained by adding together the rotation angle of each of the three rotations. For example, if the first rotation is 90 degrees, the second rotation is 90 degrees, and the third rotation is 180 degrees, the cumulative rotation angle A is 360 degrees.

As shown in FIG. 5, the proposing apparatus 12 is provided with a memory 39 for storing the data S, T, O, R and A described above.

The proposing apparatus 12 is also provided with a bending sequence/bending tool proposals list display screen generating means 17 for generating a bending sequence/bending tool proposals list display screen based on data or information from the memory 35.

Figure 7:
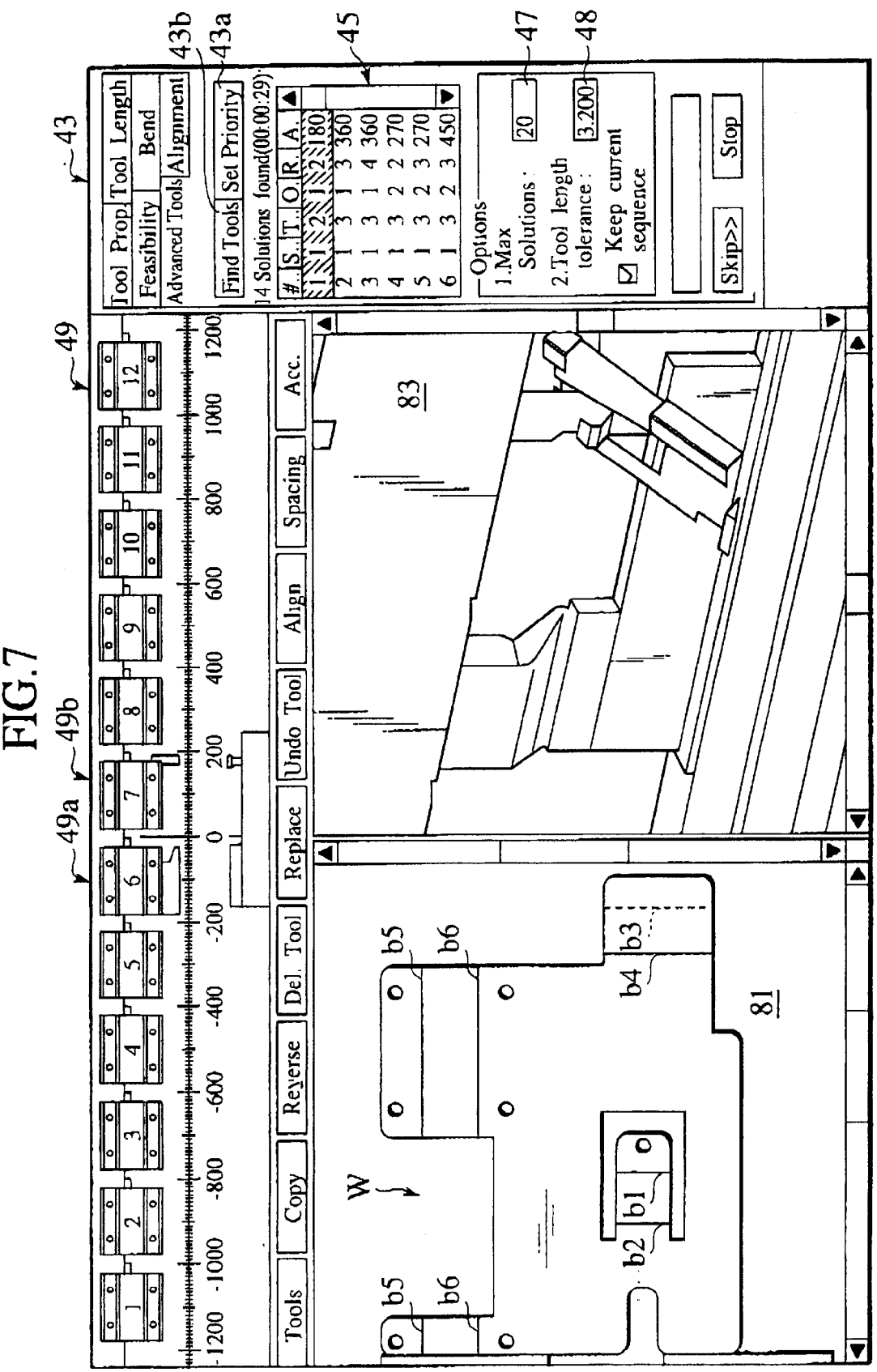
FIG. 7 shows one example of a bending sequence/bending tool proposal list display screen generated by a bending sequence/bending tool proposal list display screen generating means.

FIG. 7 shows one example of a bending sequence/bending tool proposals list display screen 45 generated by the bending sequence/bending tool proposals list display screen generating means 17. As shown in FIG. 7, in this embodiment, the display screen 45 is displayed on the display device of the CAM 11 as a portion of an information/data input-output screen 43.

Figure 8:
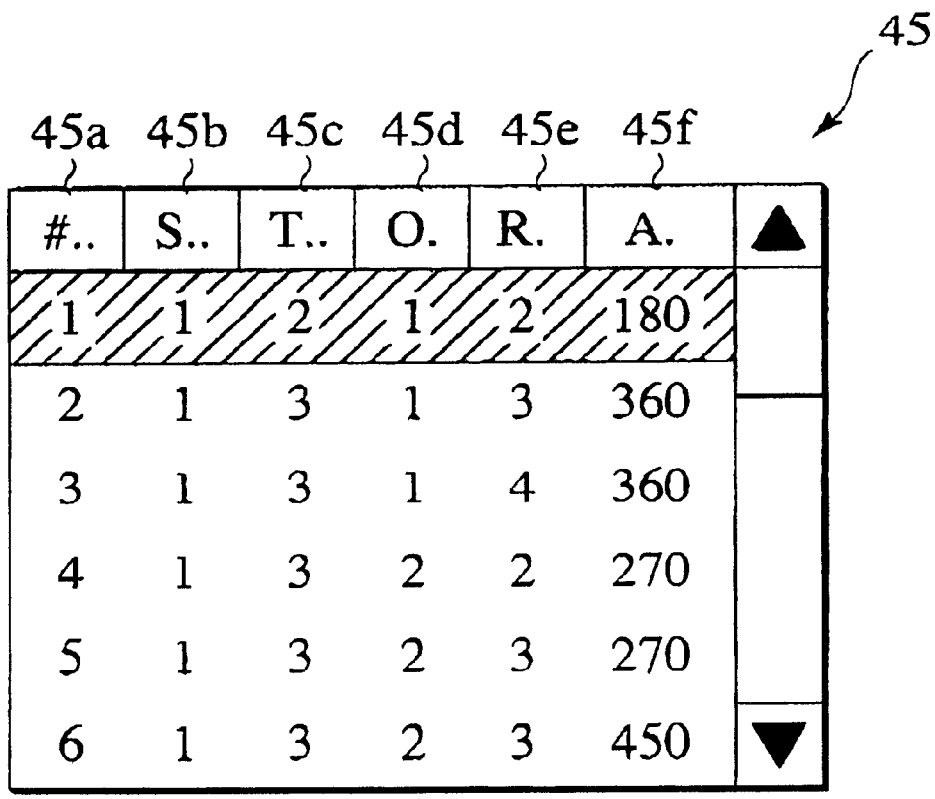
FIG. 8 is an enlarged view of one portion of FIG. 7.

FIG. 8 shows an enlarged view of the list display screen 45. As shown in FIG. 8, this list display screen 45 is provided with a list number column 45a, a number of required setup operations column 45b, a number of stages column 45c, a number of turnovers column 45d, a number of rotations column 45e, and a cumulative rotation angle column 45f.

Further, as shown in FIG. 5, the proposing apparatus 12 is provided with a priority item memory 43 for establishing priority items used for establishing a display order of the bending sequence proposals when displaying the bending sequence proposals or bending tool proposals list screen 45 generated by the display screen generating means 17. The priority items stored in this memory 43 are displayed in the display column 33 of FIG. 6.

For example, as shown in the display column 33, in the case where the minimum number of stage layouts T, the minimum number of turnovers O, and the minimum number of rotations R are established as priority items, the plurality of bending sequence proposals (list) is arranged in the screen 45 in an order starting from the minimum number of stage layouts T, the minimum number of turnovers O, and the minimum number of rotations R. In the display screen 45 shown in FIG. 7 and FIG. 8, six bending sequence proposals are displayed in an order starting from the minimum number of stage layouts T, the minimum number of turnovers O, and the minimum number of rotations R.

Generally, it is understood that the number of operations an operator performs in the setup operations stage increases toward a maximum when the number of stage layouts T increase, the burden of the operator increases when the number of work turnovers O increase, and the labor burden of the operator goes up when the number of rotations R increase. Accordingly, by displaying the bending sequence proposals in the order of the priority items, the user can easily detect the bending sequence proposals having a low labor burden from the plurality of bending sequence proposals in the display screen 45.

Further, by displaying the number of required setup operations S, the number of stages T, the number of turnovers O, the number of rotations R, and the cumulative rotation angle A in the proposals display screen 45, the user can grasp the bending sequence proposal that he or she thinks is suited to one's own factory from the plurality of bending sequence proposals (displayed as 1~6 in FIG. 7) displayed in the screen 45.

As shown in FIG. 5, the proposing apparatus 12 is also provided with a bending stage view display screen generating means or system 41 for generating a bending stage view display screen.

The screen 49 of FIG. 7 shows the bending stage view generated by the bending stage view display screen generating means 41. As shown in FIG. 7, in this example the bending stages include a first stage 49a and a second stage 49b.

Furthermore, the bending stage view that is displayed in the present embodiment is the bending stage view for the bending sequence proposal indicated in reversed black and white character representation in the display screen 45 by the positioning of the cursor thereon.

Accordingly, with reference to this view screen 49, the operator or user can easily check whether or not the bending stages for the selected bending sequence proposal are suited for the work environment in one's own factory.

Now, in the present embodiment, as was described above, only the stage view 49 of the bending sequence proposal selected in the screen 45 is displayed. However, the present invention is not limited to this arrangement, and it is possible, for example, to simultaneously display all the stage views of the six bending proposals displayed on screen 45. Alternatively, it is possible to provide a structure which makes it possible to carry out a scan on all the stage views of all the detected bending sequence proposals irrespective of the display on the display screen 45.

In this way, judgements concerning the number of stages in each bending sequence proposal, which has a large labor burden in the bending operations, can be carried out by making relative comparisons.

As shown in FIG. 5, a bending sequence proposal maximum number establishment memory 16a is also provided in the proposing apparatus 12. The bending sequence proposal maximum number stored in this memory 16a is established as the maximum number of the detected bending sequence proposals when bending sequence proposals and bending tool proposals are detected by the detection means 15.

As shown in FIG. 7, a maximum number establishment column 47 for inputting a maximum number is provided in the screen 43.

Further, as shown in FIG. 7, the screen 43 is also provided with a tool length tolerance establishment column 48 for establishing the allowable difference in the case where the length of the bending tool is shorter than the length of the bending line in the bending sequence proposals and bending tool proposals detected by the detection means 15. Further, the proposing apparatus 12 is also provided with a memory (not shown in the drawings) for storing established tool length tolerance values.

As is further shown in FIG. 7, the screen 43 is also provided with a bending sequence fixing button for fixing the bending sequence of a certain bending line in advance when the bending sequences and the bending tools of the bending lines b1~b6 are detected by the detection means 15.

Further, as shown in FIG. 7, the screen 43 is also provided with a priority conditions establishment button 43a and a search start button 43b. In this regard, the priority conditions establishment button 43a is a button for establishing priority conditions while referring to the display screen 27 shown in FIG. 6.

As shown in FIG. 7, the display screen 43 includes a development plan view 81 showing the development plan of the work part W that forms the work, and a perspective image view 83 showing a bending process perspective image during the bending process. These views 81 and 83 are generated respectively by a development plan view display screen generating means or system 85 and a perspective image view display screen generating means or system 87 provided in the proposing apparatus 12.

As shown in FIG. 5, the proposing apparatus 12 is also provided with a priority bending line memory 16b for establishing the bending lines or bending points that require priority in the bending process in detecting bending sequence proposals or bending tool proposals for the bending process carried out on the work part W. For example, in FIG. 4, the condition that a bending process must be carried out first on the bending lines b1 and b2 of the cutaway portion may be established as a priority condition. Further, the condition that a bending process must be carried out on the bending line b3 before the bending line b4, and the condition that a bending process must be carried out on the bending line b5 before the bending line b6 may be established as priority conditions.

In this way, in the case where bending sequence proposals or bending tool proposals are detected by the detection means 15, it becomes possible to easily and quickly detect bending sequences which make it possible to carry out a bending process.

Figure 9:
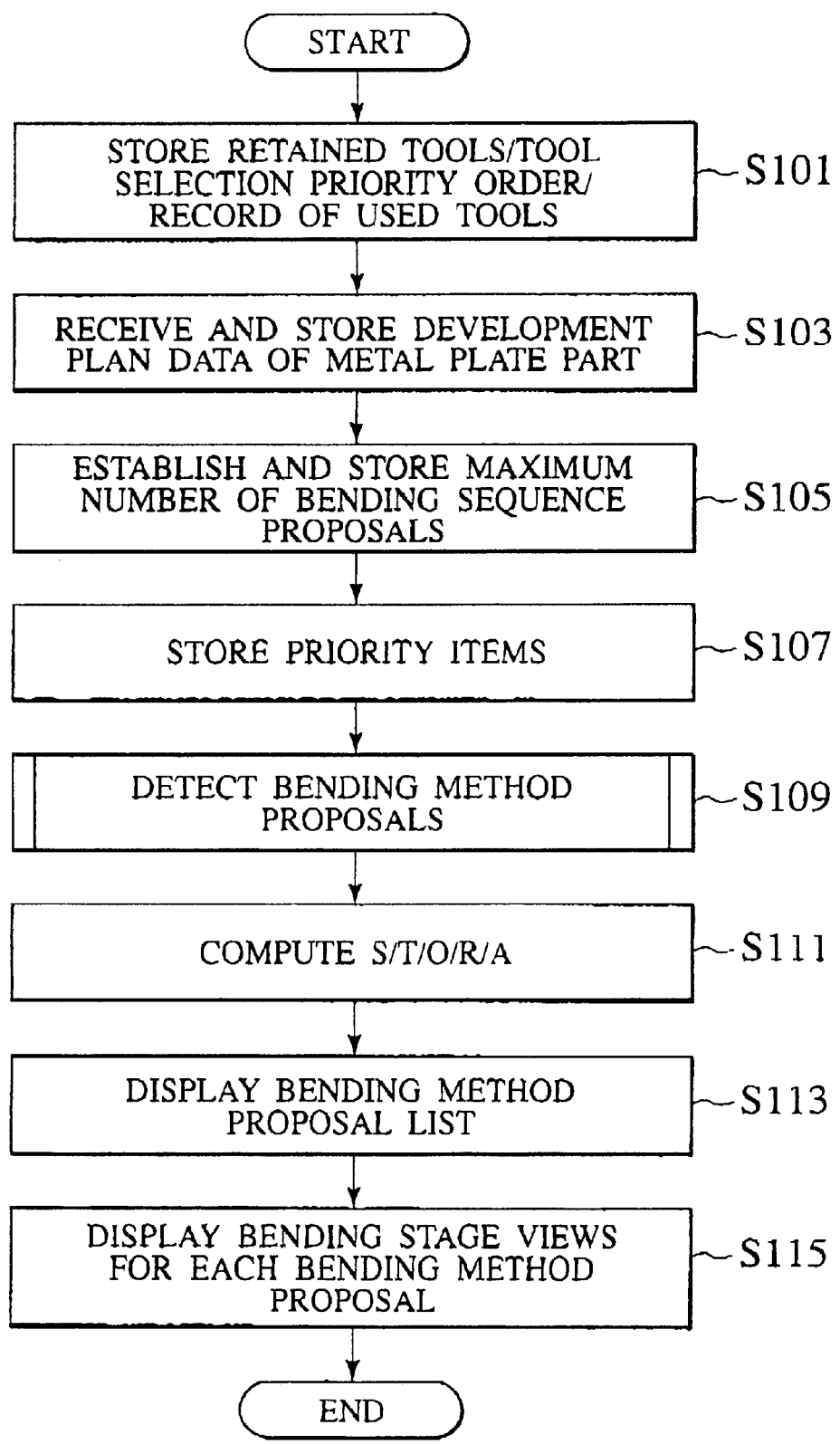
FIG. 9 shows a flow chart of the method of proposing bending sequences and bending tools according to the present invention.

Next, FIG. 9 is a flow chart showing a method of detecting bending sequence proposals and bending tool proposals using the proposing apparatus 12.

At Step S101, retained tools, tool selection priority order, and a record of used tools are stored in the memories 19, 23, and 21.

At Step S103, development plan data of the work part W is received from the CAD and the like and stored.

At Step S105, the reference numbers of the bending lines or bending points that require priority in the bending process, and the maximum number of bending sequence proposals that will be detected are established and stored.

At Step S107, priority items (see column 33 in FIG. 6) that will determine the display order of the detected bending sequence proposals are established and stored.

At Step S109, the bending sequence proposals and the bending tool proposals are detected in a sequential manner based on the development plan, the retained tools, the tool selection priority order, the record of used tools, the reference numbers of the priority bending lines, and the maximum number of bending sequence proposals that can be detected.

At Step S111, the number of required setup operations S of the tool, the number of stages T of the tool, the number of front-back turnovers O of the work part W, the number of rotations R within the plane of the metal plate work part W, and the cumulative rotation angle A within the plane of the metal plate work part W are computed for each bending sequence.

At Step S113, the bending sequence proposals and the bending tool proposals are displayed in the same manner as that shown in the screen 45 of FIG. 7 based on the results of Steps 109 and 111.

At Step S115, views of the bending stages of each bending sequence proposal are displayed as shown by the view screen 49 of FIG. 7.

Figure 10:
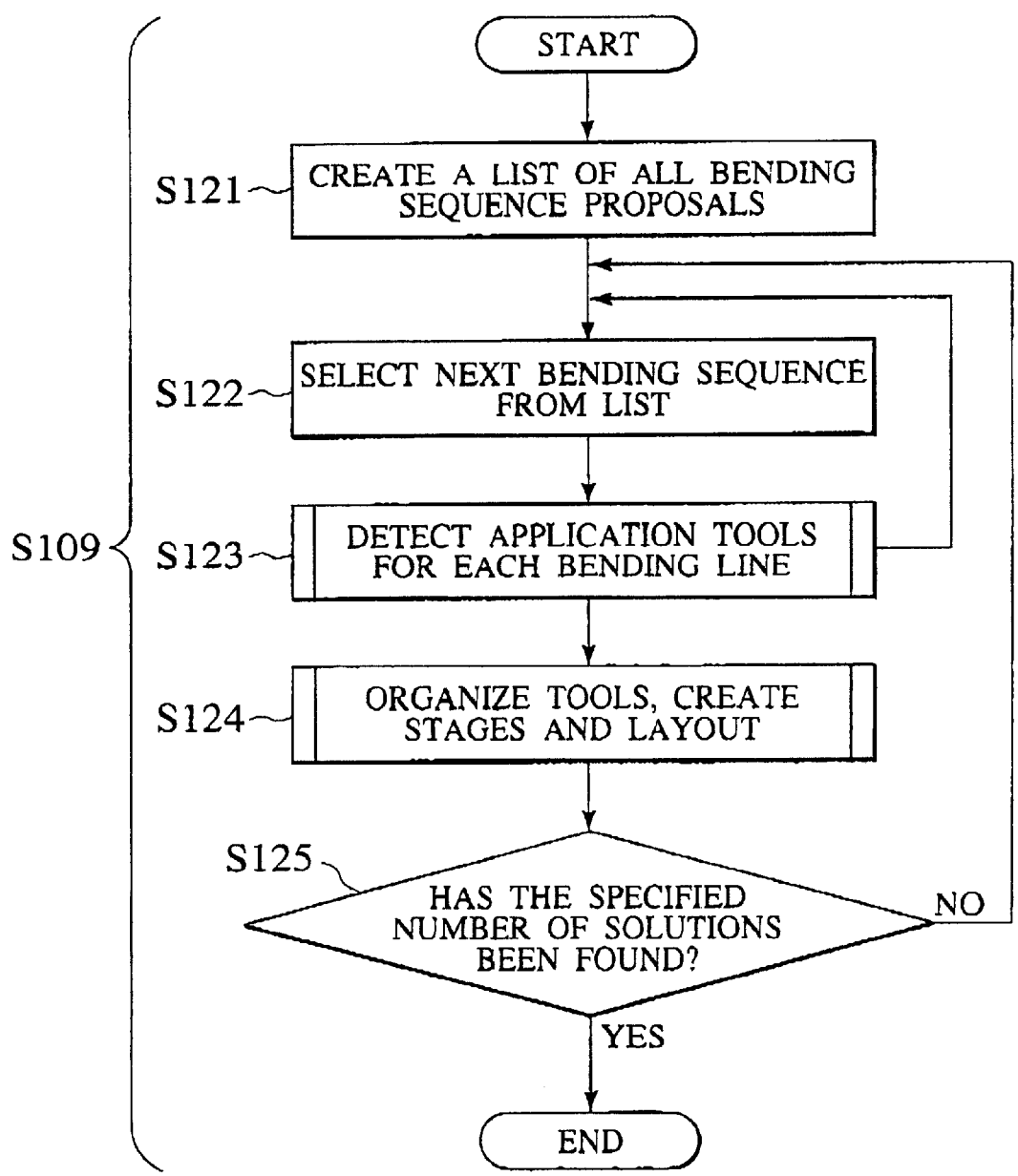
FIG. 10 shows a flow chart of the method of detecting bending sequence proposals and bending tool proposals carried out at Step S109 of FIG. 9.

Next, FIG. 10 is a flow chart showing the method of detecting bending sequence proposals and bending tool proposals carried out in Step S109.

At Step S121, development plan data of the metal work part W is accessed from the development plan data memory 13, and then a list of all the bending sequences is prepared based on such data. For example, in the case of the metal plate work part W shown in FIG. 1 or FIG. 4 which has the six bending lines b1 through b6, because there are 6!=720 different combinations of such bending lines, the bending sequence list will include 720 bending sequences. In this list, whether the sequence enables bending or not is not brought into question.

At Step S122, the first bending sequence is selected from the bending sequence list.

At Step S123, a pair of application tools for each of the bending lines in the selected bending sequence are detected one at a time. Then, if an application tool is detected for all the bending lines of the selected bending sequence, such bending sequence becomes a bending sequence proposal. However, if an application tool is not detected, the process returns to Step S122 at that point, and the next bending sequence is selected.

At Step S124, the detected tool is put in order, and the stages and layout of the stages on the bending machine are created. As will be described later, at this step, all the detected tools are searched to determine whether or not there are any tools that can be used in common, and if there is a tool that can be used in common, one tool is used in place of the other. In this way, it is possible to reduce the number of application tools.

At Step S125, the maximum number of bending sequence proposals is accessed from the bending sequence proposal maximum number establishment memory 16a, and a judgement of whether or not the maximum number of bending sequence proposals has been reached is carried out. If the number of bending sequence proposals reaches the maximum number, the detection process is terminated. If the maximum number has not been reached yet, the process returns to Step S122, and the next bending sequence is selected.

Figure 11:
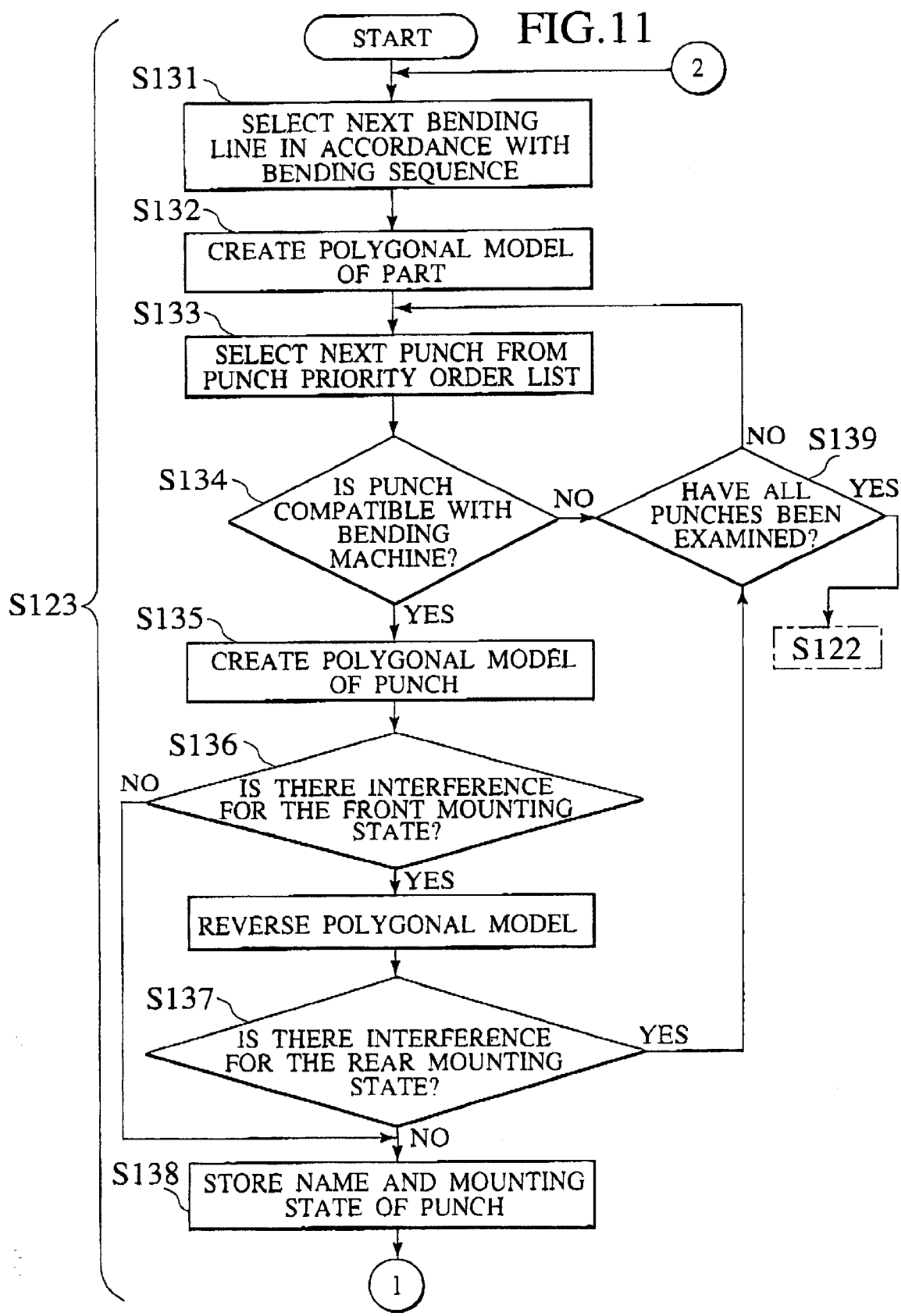
FIGS. 11 and 12 show a flow chart of the method of detecting application tools for each bending line carried out at Step S123 of FIG. 10.
Figure 12:
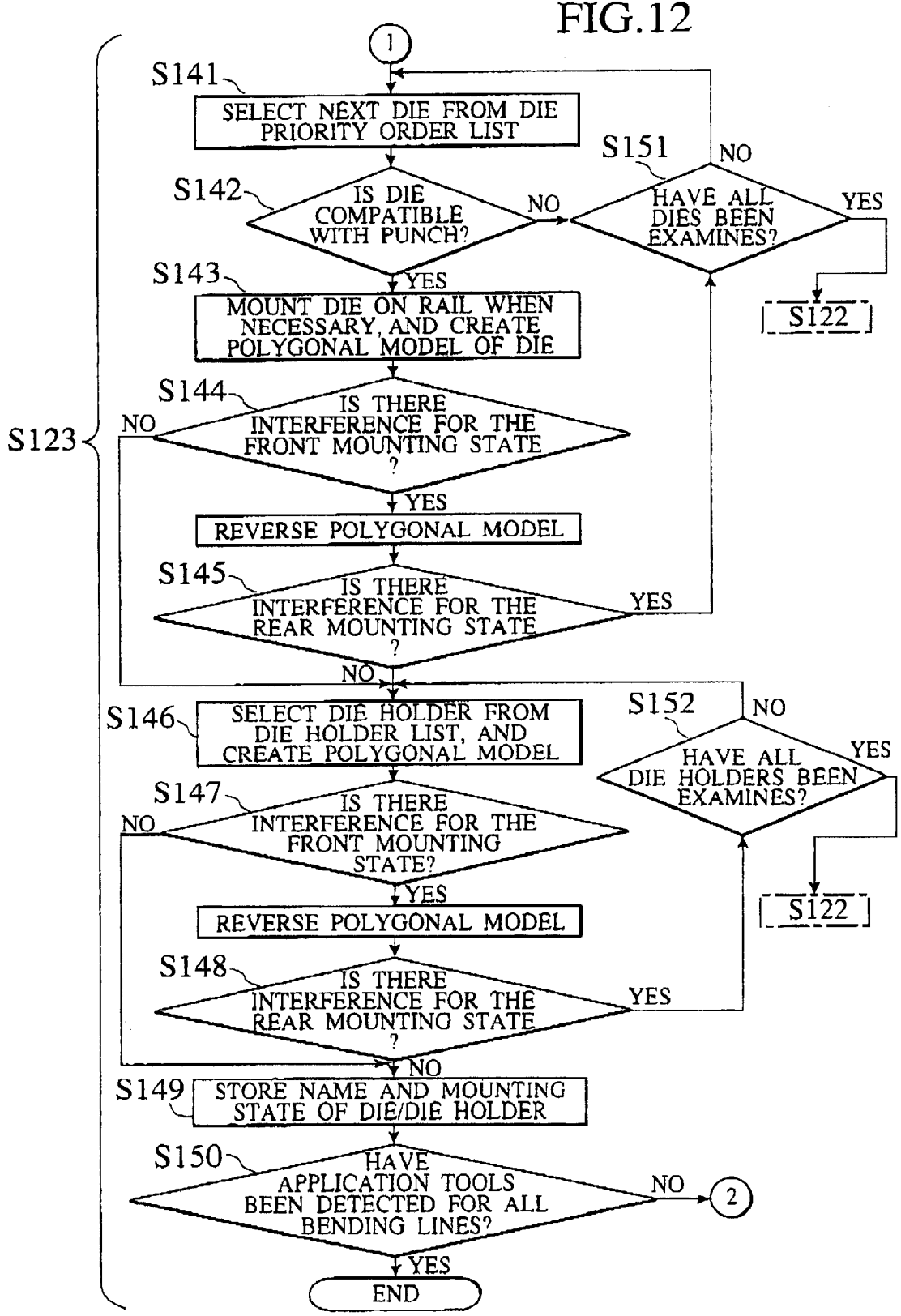

Next, FIGS. 11 and 12 show a flow chart of the method of detecting application tools for each bending line carried out at Step S123 of FIG. 10.

Steps S131 to S139 of FIG. 11 show the detection process of the punch.

At Step S131, a bending line is sequentially selected, for example, in the development sequence (i.e., the reverse sequence of the bending sequence) in accordance with the bending sequence selected at Step S122.

At Step S132, a polygonal model of the work part before and after the bending process of the selected bending line is created based on the development plan data. This polygonal model is a three-dimensional model on the CAD, for example. Further, the polygonal model of the work part before and after the bending process refers to the shape of the work part during the continuous transformation process from before the bending process to after the bending process. For example, if the bending sequence for the metal plate work part W of FIG. 1 or FIG. 4 is b1-b2-b3-b4-b5-b6, the polygonal model before and after the bending process of the bending line b6 selected at Step S131 is created by rotating the final process shape (three-dimensional shape) flange W1 shown in FIG. 1 ninety degrees around the bending line b6.

At Step S133, a punch priority order list is accessed from the tool selection priority order memory 23, and the punch having the highest priority order rank is selected from such list.

At Step S134, a judgement of whether or not the punch is compatible with the bending machine and punch holder is carried out. To describe in more detail, whether the height of the punch is compatible with the bending machine being used, and whether the length of the punch is compatible with the bending machine and punch holder are checked. If all the retained tools are known to be compatible with the bending machine, this check may be omitted.

Now, if the punch is judged to be compatible at Step S134, the process proceeds to the Step S135. If the punch is judged to be incompatible, a check of whether or not all the punches have been tested is carried out at Step S139. If all the punches have not been tested, the process returns to Step S133, and the next high priority sequence rank punch is selected. If all the punches have been tested, the process returns to Step S122 of FIG. 10, and the next bending sequence is selected.

At Step S135, a polygonal model of the punch is created based on the geometric information of the retained tools accessed from the retained tool memory 19.

Figure 14A:
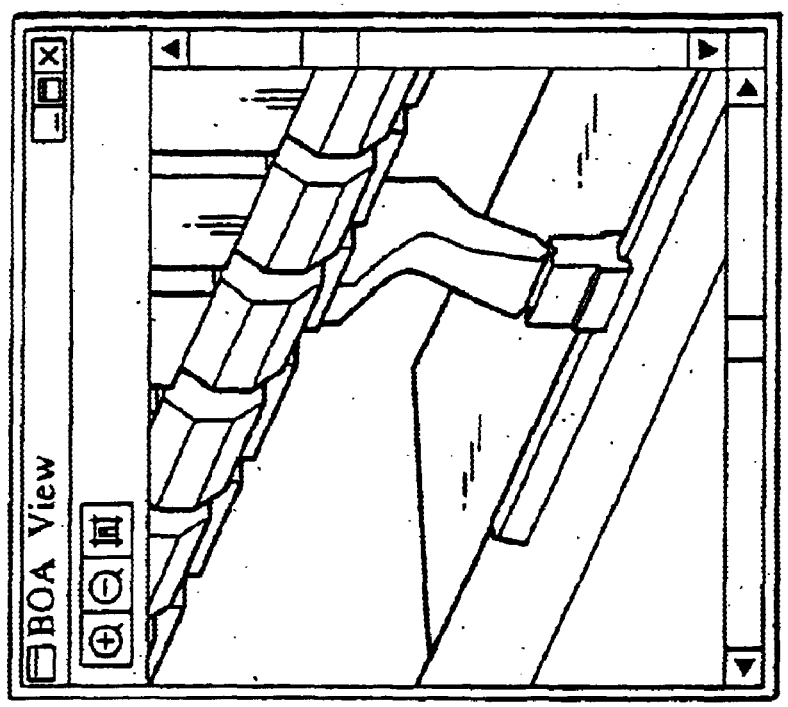
FIG. 14A is a perspective view of the front mounting state of a punch arranged in a bending machine.

At Step S136, a judgement process is carried out to judge whether or not there is interference between the work part and the bending machine (including the punch holder), and whether or not there is interference between the work part and the punch arranged in a front mounting state, before and after the bending process. As shown in the left side of FIG. 14, the front mounting state refers to the mounting state of the tool in which the front surface of the tool is in the same side as the front surface of the bending machine, namely, the side where the work part is inserted. To describe in more detail, a check for interference is carried out using the polygonal model of the work part before and after the bending process generated at Step S132, the polygonal model of the punch in the front mounting state, and a polygonal model of the bending machine. Further, the polygonal model of the bending machine is created so as to include the punch holder, and this model is stored in advance.

If no interference is judged to exist between the punch and the work part, and between the bending machine and the work part at Step S136, the process proceeds to Step S138. If interference is judged to exist either between the punch and part or between the bending machine and the work part, the polygonal model of the punch is reversed and the process proceeds to Step S137.

Figure 14B:
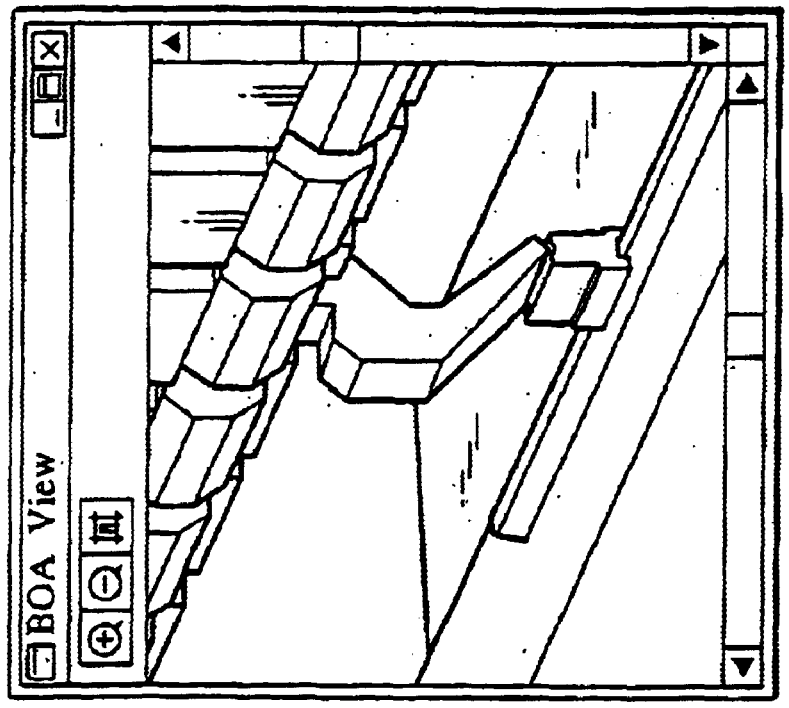
FIG. 14B is a perspective view of the rear mounting state of a punch arranged in a bending machine.

At Step S137, a judgement process is carried out to judge whether or not there is interference between the part and the punch arranged in a rear mounting state before and after the bending process. As shown in FIG. 14(b), the rear mounting state refers to the mounting state of the tool in which the rear surface of the tool is arranged on the same side as the front surface of the bending machine.

If no interference is judged to exist at Step S137, the process proceeds to Step S138. At Step S138, the name and mounting state (front mounting state, rear mounting state) of the detected punch are stored in relation to the bending sequence and the bending line.

On the other hand, if interference is judged to exist at Step S137, a check of whether or not all the punches have been examined is carried out at Step S139. If all the punches have not been examined, the process returns to Step S133, and the next punch having a high priority order rank is selected. If all the punches have been examined, the process returns to Step S122 of FIG. 10, and the next bending sequence is selected.

Next, Steps S141 to S150 of FIG. 12 show the process of detecting the die and die holder.

At Step S141, a die priority order list is accessed from the tool selection priority order memory 23, and the die having the highest priority order rank is selected from such list.

At Step S142, a judgement of whether or not the selected die is compatible with the detected punch is carried out. To describe in more detail, a check of whether or not the geometric parameters such as the height, the length, the angle and the like of the die are compatible with those of the punch is carried out. In the case where such parameters are judged to be compatible at Step S142, the process proceeds to Step S143. If such parameters are judged to be incompatible, a check of whether or not all the dies have been examined is carried out at Step S149. If all the dies have not been examined, the process returns to Step S141, and the next die having a high priority order rank is selected. If all the dies have been examined, the process returns to Step S122 of FIG. 10, and the next bending sequence is selected.

At Step S143, the die is mounted on a rail when necessary, and a polygonal model of the die is generated by a computer. In the same manner as the polygonal model of the punch, the polygonal model of the die may also be generated based on geometric information of retained tools. Further, if a rail is needed, the polygonal model of the die will include the shape of the rail.

At Step S144, a judgement process is carried out to judge whether or not there is interference between the work part and the bending machine, and whether or not there is interference between the work part and the die arranged in a front mounting state, before and after the bending process. A check for interference is carried out using the polygonal model of the work part before and after the bending process, the polygonal model of the die in the front mounting state, and a polygonal model of the bending machine.

If no interference is judged to exist between the die and the work part, and between the bending machine and the work part at Step S144, the process proceeds to Step S146. If interference is judged to exist either between the die and the work part or between the bending machine and the work part, the polygonal model of the die is reversed and the process proceeds to Step S145.

At Step S145, a judgment process is carried out to judge whether or not there is interference between the work part and the die arranged in a rear mounting state before and after the bending process. If no interference is judged to exist at Step S145, the process proceeds to Step S146. On the other hand, if interference is judged to exist, a check of whether or not all the dies have been examined is carried out at Step S151. If all the dies have not been examined, the process returns to Step S141, and the next die having a high priority order rank is selected. If all the dies have been examined, the process returns to Step S122 of FIG. 10, and the next bending sequence is selected.

At Step S146, a die holder is selected from the die holder list of the retained tool memory 19, and then a polygonal model of such die holder is generated.

At Step S147, a judgement process is carried out to judge whether or not there is interference between the work part and the die holder arranged in a front mounting state, before and after the bending process. A check for interference is carried out using the polygonal model of the work part before and after the bending process and the polygonal model of the die holder.

If no interference is judged to exist between the die holder and the work part at Step S147, the process proceeds to Step S149. If interference is judged to exist either between the die holder and the work part, the polygonal model of the die holder is reversed and the process proceeds to Step S148.

At Step S148, a judgment process is carried out to judge whether or not there is interference between the work part and the die holder arranged in a rear mounting state before and after the bending process. If no interference is judged to exist at Step S148, the process proceeds to Step S149. On the other hand, if interference is judged to exist, a check of whether or not all the die holders have been examined is carried out at Step S152. If all the die holders have not been examined, the process returns to Step S146, and the next die holder having a high priority order rank is selected. If all the die holders have been examined, the process returns to Step S122 of FIG. 10, and the next bending sequence is selected.

At Step S149, the names of the detected die and the die holder are stored in relation to the data of the punch stored at Step S138.

At Step S150, a judgement process is carried out to judge whether or not the detection of application tools for all the bending lines has been completed. If detection for all the bending lines has not been completed, the process returns to Step S131 (FIG. 11), and the next bending line is selected.

Now, when the process described above returns to Step S122 from Step S139, Step S151 or Step S152 in order to select the next bending sequence, such selection can be influenced by the detection results of the previous tools. For example, for the bending sequence b1-b2-b3-b4-b5-b6 of the metal plate part of FIG. 4, we may assume a case exists where application tools can be detected for the bending lines b6 and b5, but cannot be detected for the bending line b4. In this case, after such detection, the entire bending sequence— b4-b5-b6 can be removed from the bending sequence list or arranged so as not to be selected.

As described above, application tools are detected sequentially for the punch, die and die holder. The reason that detection is carried out first for the punch is that the determination of whether or not the metal plate part can be bent by the bending sequence thereof depends for the most part on whether there is interference between the punch and part.

FIG. 13 shows the process of organizing the tools and creating the stages and layout.

At Step S161, the tools detected at Step S123 are classified according to cross-sectional shape and length, and the longest tool for each cross-sectional shape is selected. In this connection, the same tools are regarded as having the same cross-sectional shape regardless of whether the tools are in a front mounting state or rear mounting state.

At Step S162, a judgement process is carried out to judge whether or not the selected tool can be used as an application tool for other bending lines that would use tools (with the same cross-sectional shape) having a shorter length than the selected tool. This judgement of whether the selected tool can be used for other bending lines is carried out by checking whether or not there is interference between the tool and the work part in the same manner as the detection of application tools of FIGS. 11 and 12. For example, if the application tool of the bending line b6 in the metal plate work part of FIG. 4 is selected at Step S161, a check of whether or not there will be interference between this selected tool and each of the bending lines b1 to b5, which use tools having a shorter length as application tools, is carried out sequentially.

If no interference is judged to exist at Step S162, the process proceeds to Step S163. At Step S163, the application tools for the bending lines are replaced with the tool selected at Step S161, For example, in the example shown in FIG. 4, if the application tool of the bending line b6 creates no interference with the process of the bending line b1, the application tool of the bending line b1 can be replaced by the application tool of the bending line b6.

On the other hand, if interference is judged to exist at Step S162, the process proceeds to Step S164. At Step S164, a judgement process is carried out to judge whether or not the examination of all the bending lines that use tools having a shorter length than the tools selected at Step S161 as application tools has been completed, If the examination of all the bending lines has been completed, the process proceeds to Step S165. If the examination of all the bending lines has not been completed yet, the process returns to Step S162, and a check of interference is carried out for the next bending line.

At Step S165, a judgment of whether or not all the tools have been selected at Step S165 is carried out. If all the tools have not been examined yet, the process returns to Step S161, and the next longest tool is selected.

If all the tools have been selected, the application tools that are finally assigned to each bending line by the above-described process are stored as bending tool proposals, and then the process proceeds to Step S166.

At Step S166, a stage list is generated in which one stage is assigned to the same tools in the bending tool proposals.

At Step S167, the punch holder and setup on the first bending machine is created.

At Step S168, one stage is selected from the stage list, and the arrangement thereof on the bending machine is determined. In this regard, the arrangement of such stage can be determined in accordance with factors such as the frequency of use of the stage, the bending sequence, the type of die holder used, the height and length of the tools, the width of the bending machine and the like.

At Step S169, a judgement of whether or not the arrangement of all the stages has been completed is carried out. If the arrangement of all the stages has not been completed, the process proceeds to Step S171, and a judgement of whether or not the remaining stages can be arranged in the open space of the bending machine is carried out. If this arrangement is possible, the process returns to Step S168, and the next stage is arranged. If such arrangement is not possible, the process returns to Step S167, and the setup on the next bending machine is created. If the arrangement of all the stages is judged to be completed at Step S169, the process proceeds to Step S170.

At Step S170, information such as the type of stages, the arrangement of each stage on the bending machine, the number of setups and the like are added to the data of the bending sequence proposals and bending tool proposals and stored therein.

In accordance with the present embodiment, by making sequential reference to the bending sequence proposals and the bending tool proposals displayed on the screens 45 and 49, a user or operator can easily select the bending sequences and the bending tools (including bending tool stages) in such bending sequences that are compatible with one's own factory, or one's own press brake or retained tools.

As described above, the present invention makes it possible to determine the bending sequences and bending tools for the metal plate part (including bent portions) that will be compatible with the jobsite at the bending factory. Further, by incorporating information about the actual jobsite, it is possible to determine the optimum bending sequence.

What is claimed is:

1. A method of detecting bending sequences and bending tools, comprising:
   storing a development plan for a metal plate part having a plurality of bending regions;
   inputting a maximum number of bending sequence proposals to be detected;
   detecting up to the maximum number of bending sequence proposals based on the development plan;
   detecting bending tool proposals used in each bending process of the detected bending sequence proposals; and
   displaying the detected bending sequence proposals and the detected bending tool proposals;
   wherein the detecting the bending tool proposals includes detecting interference between the bending tools and the metal plate part for each mounting state of the bending tools on a bending machine.

2. The method of claim 1, wherein the mounting state of the bending tools includes a front mounting state and a rear mounting state.

3. The method of claim 1, wherein the detecting the bending tool proposals is performed in the order of punches, dies and die holders.

4. The method of claim 1, further comprising inputting a selection priority order of application tools.

5. The method of claim 1, further comprising:
   determining whether a first bending tool of a first bending operation can be used in place of a second bending tool of a second bending operation; and
   replacing the second bending tool of the second bending operation with the first bending tool when such replacement is determined to be possible.

6. The method of claim 5, wherein the first bending tool is longer than the second bending tool.

7. The method of claim 5, further comprising determining the arrangement of each stage on the bending machine.

8. An apparatus for proposing bending sequences and bending, comprising:
   a storage that stores a development plan of a metal plate part;
   a detector that detects a plurality of bending sequence proposals that enable the manufacture of the metal plate part based on the development plan, and bending tool proposals used in each bending process of each bending sequence proposal; and
   a display that displays the plurality of bending sequence proposals, wherein said display includes information showing the stage numbers in each bending sequence proposal.

9. The apparatus of claim 8, further comprising a system for storing retained tools.

10. The apparatus of claim 9, wherein the detection of the bending sequence proposals and the bending tool proposals is performed based on at least one of retained tool information and application tool priority information.

11. The apparatus of claim 8, further comprising a system for storing a selection priority order of application tools.

12. The apparatus of claim 11, wherein the detection of the bending sequence proposals and the bending tool proposals is based on at least one of retained tool information and application tool priority information.

13. The apparatus of claim 8, further comprising a system for storing priority items.

14. The apparatus of claim 13, wherein the priority items include at least one item chosen from the minimum number of stages, the minimum number of turnovers, and the minimum number of rotations.

15. The apparatus of claim 14, wherein the display is shown in an order starting from one of the minimum number of stages, the minimum number of turnovers, and the minimum number of rotations.

16. The apparatus of claim 8, wherein the display includes at least one of information showing the setup number, the number of turnovers and the number of rotations in each bending sequence proposal.

17. The apparatus of claim 16, wherein the display includes information showing the total rotation angle in each bending sequence proposal.

* * * * *